United States Patent [19] [11] 3,722,426
Beer [45] Mar. 27, 1973

[54] AUTOMATED TRACK-GUIDED MATERIAL HANDLING SYSTEM WITH ELECTRICAL PULSE PROGRAMMING

[76] Inventor: Egon Beer, 1163 East 332nd Street, Eastlake, Ohio 44094

[22] Filed: Apr. 15, 1971

[21] Appl. No.: 134,136

[52] U.S. Cl. ................................................. 104/88
[51] Int. Cl. .............................................. B61l 27/04
[58] Field of Search ....104/88; 187/29 R; 214/16.4 B

[56] References Cited

UNITED STATES PATENTS 2,529,804  11/1950  Harnischfeger et al. ............. 104/88
2,707,666  5/1955  Becker ......................... 214/16.1 EB Primary Examiner—Robert G. Sheridan
Assistant Examiner—George H. Libman
Attorney—Isler & Ornstein

[57] ABSTRACT

An automated material handling system utilizing a track-guided electrically powered material transporter and a plurality of work stations located in spaced relationship along the track. A common control circuit interconnects all the stations and is activated by an electrical pulse circuit operable from any station for selectively directing movement of the transporter to or from one of the stations along any portion of the track. The system includes safeguard control means for correcting or preventing ineffectual or overlapping programming of the transporter movement.

11 Claims, 3 Drawing Figures

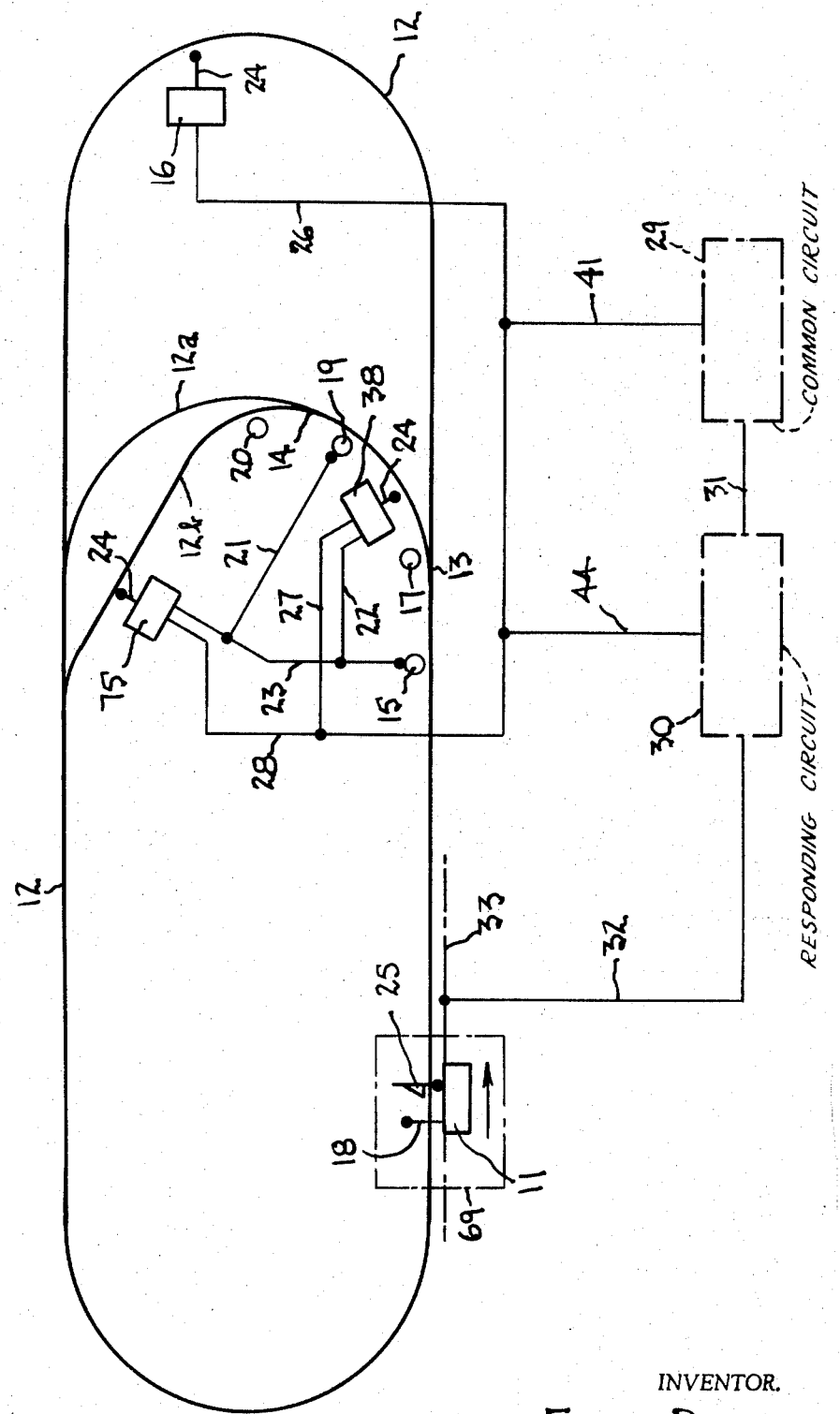

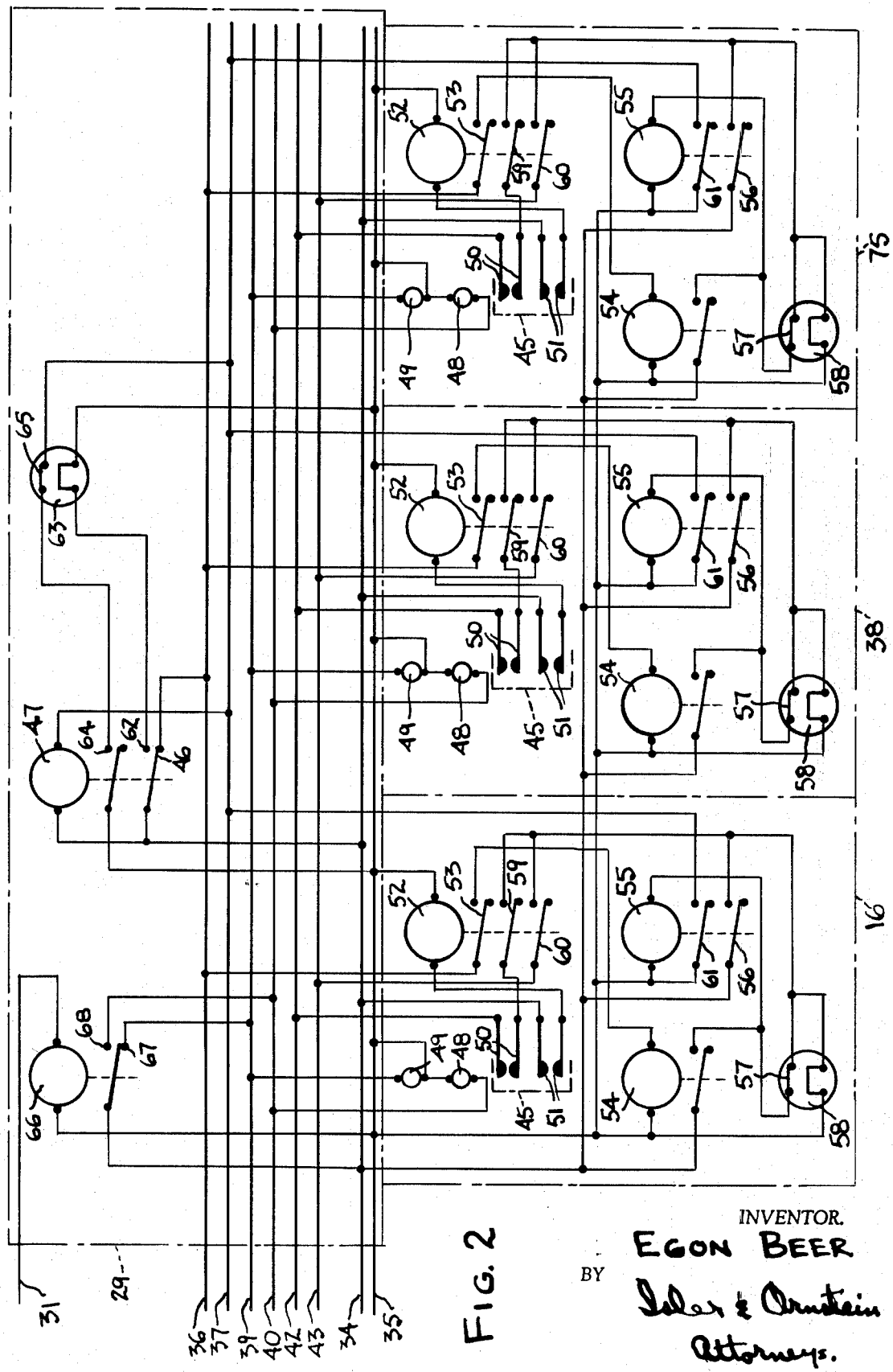

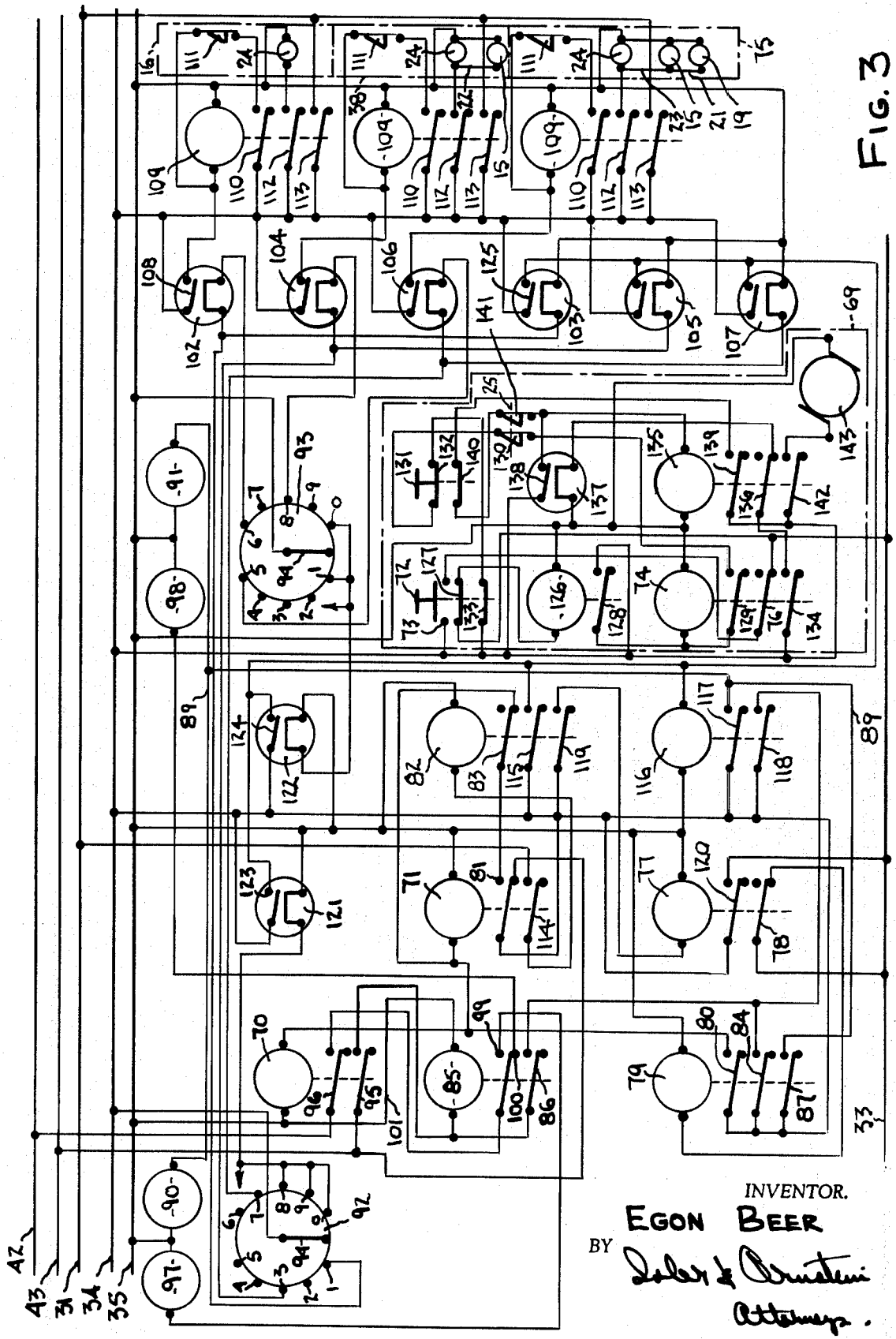

3,722,426

AUTOMATED TRACK-GUIDED MATERIAL HANDLING SYSTEM WITH ELECTRICAL PULSE PROGRAMMING

BACKGROUND OF THE INVENTION

Automated material transporting systems are known to the art and in their most common form consist of implaced conveyor apparatus, such as roller conveyors or endless belt conveyors, by means of which material loaded at or discharged from one work station is continuously transported to a specific, predetermined destination or next work station. Another form of material handling system which is in common usage is the continuously moving transport system using overhead moving work carriers or the like which maintain constant motion in a fixed, endless path of movement through work stations at which the material can be processed while in movement or can be unloaded from the carrier, processed and loaded back onto the carrier for movement to the next station.

There are other variations of these basic types of automated material handling systems, but all are directed primarily to continuous movement of the material conveying mechanism in a predetermined fixed path between a plurality of work stations. There is an existing need in many material handling situations for a flexible, selective system which is not limited to an in-line or fixed path of movement of a continuous nature. Although it is possible to provide such a flexible material handling system with sophisticated electronic circuitry and even with high frequency radio wave control or the like, the complexity and cost of such electronic systems, as well as their operative maintenance, would preclude their use in many situations where a less costly but sufficiently flexible and versatile electrical system of control could adequately serve the purpose. The invention herein described is directed toward this latter objective.

SUMMARY OF THE INVENTION

An electrically driven, track-guided material carrier or transporter is mounted on an overhead rail or the like and initiates its movement in response to a starting pulse received from the control circuitry. The track upon which the transporter moves can be endless in configuration or can have terminus points, but in either arrangement, the track can be provided with branches or spurs which permit the transporter to be switched from one line of track to another line of track, either at the same level of movement or to an elevated or lower level of movement.

Any station can call the transporter from any other station or can send the transporter to any other station by means of an electrical pulse selection system which initiates the movement of the transporter, sets the necessary rail switches for the path of movement that the transporter is to follow to reach its station of destination, and stops the transporter at the selected destination.

Six control lines and two power lines are common to all of the stations in the system, thus permitting stations to be added, removed or relocated by simply connecting them into the common circuit for all stations. The transporter unit has electrical connection with the control circuitry through a single control line represented by a bus bar mounted parallel to the track and engaging gliding collector shoes on the transporter unit.

Each of the stations is provided with like electrical components which provide each station with its own actuating circuitry which is energized in response to the electrical pulse selection which is made. Energization of a selected station precludes energization of any of the other stations on the common circuit.

A responding circuit is provided to serve all stations and selectively provide energization for the initiation of movement of the transporter and the energization of the station of destination. Physically, the responding circuit can be permanently installed in any desired location where it can be electrically connected by a single line to the previously described transporter bus bar.

The transporter itself need not carry any components of the control circuitry for either the station circuits or the responding circuit and is equipped with a limit switch and a trip arm, neither of which is electrically connected directly to the station circuits or the responding circuit, but which will physically cooperate with circuit components of any one of the station circuits which has been selectively energized. Thereby, regardless of the number of stations which are employed in the system, there is no need for any compensating change in the cooperating limit switch and trip arm of the transporter unit nor is any additional circuitry required for the transporter unit by reason of the addition or removal or relocation of any stations.

By this arrangement, a flexible and versatile material transfer system is provided which is low in initial cost, does not require highly skilled technicians for installation or maintenance, and provides for expansion and change in the number and location of stations without any significant change in the common circuitry which is utilized.

Other objects and advantages of the invention will appear more fully hereinafter.

BRIEF DESCRIPTION OF THE DRAWING

FIG. 1 is a schematic representation of a material handling system utilizing the features of my invention.

FIG. 2 is a circuit diagram showing the individual circuits of a plurality of stations and the common circuit for all of the stations.

FIG. 3 is a circuit diagram of the responding circuit for all of the stations and its connection to the transporter starting circuit.

DESCRIPTION OF THE PREFERRED EMBODIMENTS

FIG. 1 of the drawings schematically illustrates an exemplary automated material handling system with a plurality of work stations. Although for simplicity of description only three of such work stations identified as numbers 16, 38 and 75 are shown, it will be understood as the description proceeds that many more of such stations would ordinarily be contemplated and could be utilized.

The schematic representation indicates a motorized electrically driven transporter unit 11, preferably of the overhead type moving upon and guided by one or more tracks or rails 12. The main rail or track section 12 is illustrated as being endless, but includes a merging branch track 12a and another branch track 12b extending from the branch 12a to the main track. The station 16 is shown located adjacent to a portion of the main track 12, the station 38 is located adjacent to a portion of the branch track 12a, and the station 75 is shown located adjacent to a portion of the branch track 12b. The stations represent locations or areas at which the material may be loaded or unloaded for any desired purpose whatsoever, including testing, processing, finishing, painting, packaging, shipping, receiving or storage. In the illustrated example, the transporter 11 is shown as having a single direction of travel on the track, as indicated by the arrow, but, as noted above, the invention does not preclude movement of the transporter in a two-way direction, such as when a non-endless track is employed having terminals between which the transporter travels in one direction or the other.

At the entrance junction between the track 12a and the track 12, a suitable movable track switch 13 is provided for selectively directing the path of movement of the transporter either onto the branch track 12a or to maintain it on the main track 12. At the entrance junction between the branch tracks 12a and 12b, a suitable movable track switch 14 is provided to selectively define a path of movement either along the remaining portion of the branch line 12a or along the branch line 12b. The movement of the track switch 13 is controlled by a limit switch 15 disposed adjacent to the track 12 at a location ahead of the track switch 13 and a limit switch 17 located adjacent to the branch track 12a between the locations of the track switches 13 and 14. The limit switch 15 is operatively disposed in the path of movement of a trip arm 18 carried by the transporter 11 and, when the limit switch 15 is in an energized state, engagement by the trip arm 18 causes the limit switch to close a conventional operating circuit (not shown) to cause movement of the track switch to a position defining a path of travel from the main track 12 to the branch track 12a. After the transporter 11 has moved past this junction, its trip arm engages the return limit switch 17, which is always in an energized state, and which by means of conventional circuitry (not shown) causes the track switch 13 to be restored to its normal position where it defines a path of movement on the main track 12 which by-passes the branch track 12a. Similarly, a limit switch 19 is provided adjacent the track 12a ahead of the track switch 14 and a return limit switch 20 is located adjacent to the track 12b beyond the track switch 14 to cause a sequence of movement of the track switch 14 which will either direct the transporter onto the track 12b or by-pass the track 12b and maintain the transporter on the track 12a.

The return limit switches 17 and 20 are ordinarily maintained in an energized state regardless of the particular station toward which the transporter is being directed. However, the energization of the limit switches 15 and 19 is controlled and dependent upon the station circuit of the particular station of destination which has been selected for the transporter. As indicated by the line 21, the limit switch 19 is connected only to the control circuit of the station 75, but the limit switch 15 is connected by lines 22 and 23 to both stations 38 and 75 respectively, so that it can be energized by the control circuit of either of these stations.

Each of the stations is provided with a solenoid operated trip arm, such as indicated at 24 at station 16. The transporter is provided with a limit switch 25 which is adapted to be engaged by the station trip arm when such trip arm has been energized by the station circuit. As will be more fully described hereinafter, this actuation of the transporter limit switch 25 results in the stopping of the transporter at a particular station, such as the station 16 if its trip arm 24 has been energized.

As indicated by the lines 26, 27 and 28, all of the stations have common connections to a common circuit, here indicated by the block 29, and to a responding circuit, here indicated by the block 30, this common connection consisting of a series of six control lines and two power lines which will be described in greater detail hereinafter. The common circuit 29 and the responding circuit 30 are interconnected by the line 31. Additionally, the responding circuit is connected by a line 32 to a bus bar 33 which is mounted to extend substantially parallel to the track and which constitutes an extension of the line 32. Circuit components, to be described, on the transporter unit 11 have electrical connection to the bus bar by means of conventional glide collector shoes or the like (not shown) by means of which the transporter unit maintains contact with the bus bar during its movement to any location on the track.

As thus described in broad outline, it will be seen that the material handling system includes a plurality of stations, each having its own station circuit; a track guided transporter unit which is electrically powered to move toward any selected station; a common circuit and a responding circuit interconnected with each other and with all of the stations for the purpose of establishing and controlling the path and destination of movement of the transporter in the programmed path selected for it at any one of the station circuits; and a bus bar electrically interconnecting the transporter and the responding circuit to initiate movement of the transporter in the programmed manner. The electrical circuitry employed to effect this selection and programming will now be described in greater detail.

Referring more particularly to FIG. 2 of the drawings, there is illustrated the common circuit, essentially within the outline of the block 29, and the respective station circuits within the outlines of the blocks 16, 38 and 75. Each of the several station circuits is identical to the others, so that a description of the station circuit 16 will be representative of the circuits for the stations 38 and 75 as well as of any other existing stations or of stations which might be added to the system. The common circuit 29 will remain the same without regard to the number and location of the stations used in the system. Physically, the common circuit components may be permanently located in any suitable location together with the components of the responding circuit.

The power lines, represented by the hot line 34 and the neutral or ground line 35 are common to all of the circuits shown in FIG. 2 of the drawings as well as to the responding circuit and transporter starting circuit shown in FIG. 3 of the drawings and, inasmuch as such power lines are ordinarily available throughout the area in which the material handling system is located, they need not be particularly identified with any one of the circuits to the exclusion of the others. In addition to these described power lines, the common circuit 29 includes a satellite hot power line 36, a satellite neutral power line 37 and the visual signal control lines 39 and 40. These four control lines are represented by the line 41 in FIG. 1 of the drawings. The remaining two control lines are a multiple-pulse transmission line 42 and a single-pulse transmission line 43 which interconnect the station circuits with the responding circuit 30 and are indicated by the line 44 on FIG. 1 of the drawings. These pulses are initiated by an electrical pulsing dial selector mechanism 45, one of which is located in each individual station circuit for the purpose of programming the station of destination of the transporter 11.

The hot power line which serves to feed all of the individual station circuits is the satellite line 36 which is energized by connection to the hot power line 34 through the normally closed contact 46 of common circuit relay 47 when the transporter is not in a programmed state and the circuit components of the system have not yet been energized. Assuming that the transporter unit 11 has previously completed its cycle of operation by stopping at its station of destination number 75, it will now be assumed that the operator at station number 16 wants the transporter unit to come to his station. He would first glance at the pair of signal lights 48 and 49 which are part of his station circuit. If the transporter had not yet completed its previously programmed cycle of operation or if the transporter movement was already being programmed by another station, the red signal light 48 would be lit, thus informing the operator at station 16 that the transporter was not yet available for a new program of movement. However, under the assumed conditions, where the cycle of operation of the transporter has been completed and the transporter is available, the red signal 48 will not be lit but instead the green signal light 49 will be lit to give visual indication to the operator at station 16 that he can proceed with the programming of the transporter.

It will be assumed that the dial type pulsing selector 45 has a capability of selectively providing from one to ten electrical pulses through intermittently cammed contacts 50 in response to movement of the selector dial. The finger openings on the selector dial would therefore be conventionally marked with numerals or numerical digits from one through 10 to indicate the number of pulses which will be produced by the contacts 50 at each of the 10 possible positions of rotation of the dial. The tenth position is conventionally indicated by the numeral 0 rather than by the numeral 10.

In calling the transporter to his station, the operator will dial the number of his station on the selector mechanism by first dialing the numeral or position 1 to cause the contacts 50 to close once during the return spin of the dial which, as will appear hereinafter, will cause a single electrical pulse to be transmitted to the control line 42. The movement of the selector dial causes immediate closing of a second set of contacts 51 in the selector unit and maintains these contacts in a closed position during the time that the selector dial is in motion and until it returns to its original position of rest. The closing of the contacts 51 complete an energizing circuit to the station relay 52 to cause the closing of its three normally open contacts. The closing of contact 53 will energize station relay 54 by connecting it to the satellite hot line 36. This causes the normally open contact of relay 54 to close and energize station relay 55, thus serving to keep the connection of the contact 53 to satellite hot line 36 isolated from the hot line connections of the remainder of the circuit. The contact of relay 54 serves as part of the feeding line for relay 55, thus preventing feedback to satellite line 36 through the holding contact 56 of relay 55 after it has been energized by the closing of the normally open contact of relay 54. Once it has been energized, relay 55 will hold itself in an energized state through its contact 56 and through the normally closed contact 57 of a thermal time delay element 58. Thus by spinning the dial selector to the digit 1 the contacts 51 are closed to energize relay 52 which, in turn energizes relay 54 by connecting it to the satellite hot line 36, and relay 54 in turn energizes relay 55 which has its own holding circuit so that, once energized, it will stay energized independently of the de-energization of the relays 52 and 54 which occurs after the movement of the selector dial has ceased. At the same time, the single intermittent closing of the contacts 50 will transmit an electrical pulse from the hot line 34 through the now-closed contact 59 of relay 52 to the multi-pulse control line 42 which communicates with the responding circuit. While the relay 52 remains energized, its then closed contact 60 will connect the hot line 34 to the control line 43 to effectively produce a single pulse to the line 43, which communicates with the responding circuit.

As soon as the spin of the dial is completed, the contacts 51 of the selector 45 open to de-energize relay 52, causing its contacts to open and de-energize the relay 54. However, through its own holding circuit of contact 56, the relay 55 remains energized and through its now-closed contact 61 connects the neutral power line 35 to the satellite power line 37. When the line 37 thus becomes energized, it causes energization of the relay 47 which opens the contact 46 to disconnect the satellite power line 36 from its connection to the hot line 34. When relay 47 is energized, the normally open contact 62 is closed to energize a thermal time delay element 63 which is designed to have a time-out after the responding circuit is fully programmed and the transporter is already in motion, although it is energized and starts timing simultaneously with the previously described time delay element 58, whose timing period is merely sufficient to allow a reasonable time for the station selection procedure of dialing two digits. Energized relay 47 also causes the closing of contact 64 which, through the normally closed contact 65 of the time delay 63 establishes a second feeding circuit for the satellite neutral power line 37. Thus, the instant that relay 47 becomes energized through contact 61, the common satellite power line 36 becomes de-energized so that none of the other stations can initiate any programming of the transporter unit in a similar manner as, in the absence of power in the line 36, none of the other station relays 54 nor 55 can be energized nor will there by any hot line connection to the contacts 59 and 60 of the relays 52 in the other stations for transmitting pulses to the control lines 42 and 43.

However, at station 16, the holding circuit established by the contact 56 for the relay 55 is still maintained through the contact 57 of the time delay element 58 and maintains relay 55 energized and provides hot line power to the contacts 59 and 60 of relay 52 when relay 52 is again energized by the second spin of the dial of the selector 45 to the digit position 6. The time delay device 58 is designed to have a sufficient duration, e.g., 10–15 seconds, to allow sufficient time for normal manipulation of the selector dial twice, or through two dialing cycles. When the digit 6 is dialed, the selector contacts 51 again close to energize relay 52 and close the relay contacts 53, 59 and 60. The closing of the contact 53 will, due to lack of power in the satellite power line 36, have no effect upon station relay 54 and it will not become energized. Relay 55 will still remain energized as a result of the first spin of the selector dial so that the six intermittent closings of the contacts 50 of the selector 45 will be transmitted as six electrical pulses from relay contact 59 to the control line 42. Similarly, the effective single electrical pulse established during the energization of the relay 52 will be transmitted through the contact 60 to the control line 43.

After the time delay of 10 or 15 seconds for which it has been designed, the normally closed contact 57 of the time delay device will open and break the holding circuit through the contact 56 to cause de-energization of the relay 55. The opening of the relay contact 61 will break the neutral power feed established by this contact to the control line 37, but the control line 37 will still remain energized through the feed line established through the contact 65 of the time delay element 63. When the element 63 times out, the contact 65 will open to break the neutral power feed to the control line 37, thereby making this line dead and causing the de-energization of the relay 47 to restore the common circuit to its original state or condition in which the normally closed contact 46 again feeds hot line power to the satellite line 36. However, despite the establishment of this pre-existing condition, the responding circuit will not accept any additional pulse programming from any station in the system until the responding circuit has been reset after completion by the transporter of its previously programmed cycle.

The common circuit relay 66 is provided with a normally closed contact 67 which establishes an energization circuit for the green light 49 at all stations through the common control line 39. When the responding circuit 30 has been energized by pulses from any station, it will cause energization of the relay 66 through line 31, which will cause contact 67 to be opened extinguishing the green light 49 and cause contact 68 of relay 66 to close to energize the circuit to the red signal light 48 through the common control line 40. The red lamp will be lit at all stations to indicate that the responding circuit will not accept any programming. The red lamp 48 will remain lit at all stations until the responding circuit is reset at the completion of the transporter cycle, at which time the line 31 becomes deenergized and relay contact 68 is opened while relay contact 67 is closed to again light the green lamp 49 and extinguish the red lamp 48 at all stations.

The description of the material handling system now continues by reference to the responding circuit shown in FIG. 3 of the drawings.

In FIG. 3 of the drawings, the dotted line block indicated by the reference numeral 69 designates the starting circuit for the transporter 11 and the components which are physically mounted on the transporter unit. Another series of dotted outline blocks in FIG. 3 are designated by the reference characters 16, 38 and 75 to indicate that these components of the circuit are physically located at stations 16, 38 and 75 respectively, although forming part of the responding circuit which is shown in the remainder of FIG. 3.

In order that the responding circuit 30 be receptive or set to receive and react to the electrical pulse signals which are transmitted to it by the selector dial at any one of the several stations, it is necessary that a main responding relay 70 and a circuit holding relay 71 be in an energized state. This can only be initiated by momentarily depressing a spring-loaded push-button switch 72 which is physically located in the starting circuit of the transporter and will for convenience be referred to as the "release" button.

When the release button 72 is momentarily depressed, it closes contact 73 to feed power from the hot line 34 through the normally closed contact 76 of relay 74 to the bus bar line 33. This hot line power from the line 33 is fed through the normally closed contact 78 of a relay 77 to a release relay 79 for the purpose of energizing it momentarily while the release button remains depressed. The closing of the contact 80 of energized relay 79 feeds power from the hot line 34 to the relay 70 and also to relay 71 to cause energization of both of these relays. Through the now closed contact 81 of the relay 71, a hot line circuit is established through the normally closed contact 83 of a time delay relay 82, which serves as a holding circuit for the relays 70 and 71 and maintains them energized after the release button is restored to its original position and the relay 79 is no longer energized. However, before being de-energized, the contact 84 of the relay 79 has been effective to transmit at least a momentary pulse of hot line power to the normally open contact 86 of a flip flop relay 85 and has similarly fed hot line power through contact 87 of relay 79, through lines 89 to energize the reset devices 90 and 91 which are associated operatively with stepping relays 92 and 93 respectively. Each of the stepping relays has a movable contact arm 94 which is restored to its neutral or non-contact position, shown in the drawing, by means of the reset devices 90 and 91 so that any pulse-actuated movement of the contact arms 94 will be initiated from the neutral position. It is also necessary that the pulse-actuated flip flop relay 85 also have a uniformly consistent contact position at the start of each operating cycle of the transporter unit. For that reason, the previously described hot line pulse is provided to the contact 86 to momentarily energize the relay 85 and restore its contacts to the position shown in the drawing in the event that they were not already in that position. Obviously, if the contacts of the relay 85 are already in the desired starting position shown on the drawing, then the contact 86 will be open and there will be no effect on relay 85 as a consequence of the hot line energization of the contact 86 through contact 84 of relay 79.

In summary, by depressing the release button 72 on the transporter unit, the release relay 79 is momentarily energized. The contacts of the release relay 79 serve to effect resetting action of the contact arms 94 to a neutral starting position on their respective relays; set the flip flop relay to a consistent starting position of its contacts in the event that it is not already in such a position; energize the main responding relay 70; and energize the holding relay 71 which establishes a holding circuit for itself and for relay 70 which is independent of the maintenance of energization of the relay 79 which is energized only momentarily by depression of the release button.

Through its now closed contact 95, the relay 70 establishes a circuit between the pulse control line 43 and one side of the flip flop relay 85. Through its now closed contact 96, the relay 70 establishes a circuit between the pulse control line 42 and the setting or actuating device 97 of the stepping relay 92 or, alternatively to the setting or actuating device 98 of the stepping relay 93, depending upon whether the flip flop relay 85 is completing the circuit through its contact 99 or through its contact 100.

Through its connection by line 101 to the neutral line 35, the flip flop relay 85 is in readiness for energization by the hot power line pulse from line 43. The responding circuit 30 is now activated or set to receive and react to the programmed selector pulses initiated at any one of the stations in the system.

When the operator at station number 16 operated the selector mechanism to dial the digit 1 and then dialed the digit 6 to call the transporter to station number 16, two sets of electrical pulses were transmitted to the responding circuit by the control lines 42 and 43. As soon as movement of the selector mechanism 45 was initiated by the operator, the contacts 51 closed to energize relay 52 which, through its contact 60 connected the hot line 34 to the control line 43. This connection is maintained both during the clockwise and counterclockwise movement of the selector dial and results in a single power pulse which chronologically precedes and then becomes contemporaneous with the pulse or pulses produced by the selector contacts 50 on the return spin of the selector dial and transmitted to the control line 42.

The single electrical pulse carried by the line 43 is transmitted through contact 95 of relay 70 in the responding circuit to the hot side of relay 85 to energize the flip flop relay and cause its contacts 99 and 86 to close and to maintain these contacts in this position until the control line 43 transmits another pulse to the hot side of the relay 85.

On the return spin of the selector dial 45 from the digit position 1, a single momentary electrical pulse is transmitted through control line 42 and through contact 96 of relay 70 through the now closed contact 99 of relay 85 to the actuating or setting device 97 which is thereby energized to cause movement of the contact arm 94 into engagement with electrical contact 1 of stepping relay 92. Inasmuch as the contact arm 94 of the stepping relay 92 is connected to the hot line 34, its coming to rest on contact 1 of the stepping relay 92 will complete a hot line circuit from contact 1 to one side of the thermal time delay element 102 and will energize a thermal time delay element 103. The time delay element 102 will not yet be energized, as there is not yet any neutral power feed to complete the energization circuit to this device.

After the completion of the first spin of the selector dial 45, the selector contacts 51 open and relay 52 is de-energized and its contact 60 open to break the previously existing hot line connection to control line 43. On the second spin of the selector dial to the digit position 6, the selector contacts 51 again close and the control line 43 again is connected to the hot line 34 and transmits a single pulse of power to again energize the flip flop relay 85 and cause reversal of its contacts, so that the contacts 99 and 86, which were previously closed, are opened and the previously open contact 100 is closed. The contact 100 performs the same function for the stepping relay 93 as the closed contact 99 performs for the stepping relay 92. On the return spin of the selector dial from its number 6 position, the selector contacts 50 are caused to close and open six times and transmit six hot line electrical pulses through control line 42 and through contact 96 of relay 70 and contact 100 of flip flop relay 85 to the setting mechanism 98 of stepping relay 93. The contact arm 94 of the relay 93 will advance by one step or contact for each pulse that is received by the setting device 98. In response to the first pulse received from the line 42 by the actuating mechanism 98, the contact arm 94 will move into contact with the contact 1 of stepping relay 93. However, the contact arm 94 will not rest upon contact 1 for a sufficiently long period of time to cause effective actuation of any of the thermal time delay devices that are connected or might be connected to be fed by contact 1, as the next pulse transmitted by the control line 42 will advance the contact arm 94 to electrical contact with contact 2 of stepping relay 93. Successive pulses transmitted by the control line 42 will sequentially advance the contact arm 94 to contact 6 of the stepping relay where it will come to rest. Upon completion of this second spin of the selector dial, the selector contacts 51 will again open and, in the manner previously described, the control line 43 will be de-energized and the hot line connection to the flip flop relay 85 will be broken.

The contact arm 94 of the stepping relay 93 is connected to the neutral power line 35 and, by its connection with contact 6 feeds the neutral to the other side of the thermal time delay 102 to energize it.

The thermal time delay unit 102 is unique to the station circuit of station 16. It will only be energized when station 16 is called for by the selector mechanism. One such thermal time delay device, such as the device 104 for station 38 and the device 106 for station 75, must be provided in the responding circuit for each active station in the system. By contrast, the thermal time delay device 103 is not unique to any individual station, but is only unique to the contact 1 on the stepping relay 92. One such thermal time delay device is provided in the responding circuit for connection to each active contact of the stepping relay 92. Thus in the illustrated embodiment, in addition to the time delay 103, there is also provided a thermal time delay 105 connected to the active contact 3 of relay 92 and a thermal time delay device 107 connected to the active contact 7 of this stepping relay. If every one of the contacts of the relay 92 were an active or used contact, then seven additional thermal time delay devices would be required in the responding circuit for connection to these additional active contacts. Regardless of the number of two digit stations which are actively utilized in the system, there would be a maximum quantity of ten of such thermal time delay devices like 103, 105 and 107 which would be required. Thus, if there were ten stations in the system identified by the consecutive station numbers 10 through 19, the only active contact of the stepping relay 92 would be contact 1 and the previously described time delay devices 105 and 107 would not be needed. This is merely a dramatization of the previously described assertion that one of these thermal time delay devices is utilized for each active contact of the stepping relay 92 and that the number of these devices bears no necessary relationship to the number of stations involved in the system, although it would have a relationship to the numbering system which is employed for these stations. The group of time delay devices 102, 104 and 106, as well as the group of time delay devices 103, 105 and 107, all have normally open contacts. One group of these time delay devices, such as the device 102, is only operatively effective when there is proper programming of the responding circuit, whereas the other group of time delay devices, such as the device 103, is operatively effective when there has been error or unreasonable delay in the programming. This distinction is explained more fully hereinafter.

The time delay device 102 has a short delay on the order of 5 seconds or less, after which it causes its contact 108 to close to complete a hot line energizing circuit to the relay 109 which is identified with station 16. After energization, the contact 110 of relay 109 will establish a holding circuit for relay 109 through the normally closed limit switch 111 which is physically located at station 16 and which is adapted to be opened by the trip arm 18 on the transporter 11 when it reaches its station of destination. Another contact 112 of the relay 109 serves to energize the solenoid actuated trip arm 24 at station 16. A third contact 113 on the relay 109 feeds hot line power from the line 34 to the common line 31 which runs between the common circuit 29 and the responding circuit 30, which power is transmitted through the now closed contact 114 of the relay 71 to energize the time delay device 82 whose delay may be on the order of 15 seconds or less and which may have a substantially immediate reset capability after it has timed out. When the device 82 times out, the normally closed contact 83 opens to break the holding circuits for the relays 70 and 71, whereby the contact 114 of relay 71 opens to also break the energization circuit to the time delay device 82. The now open contacts 95 and 96 of the de-energized relay 70 break the connection between the responding circuit and the pulse transmitting lines 43 and 42 so that the responding circuit will be incapable of accepting any pulses which may thereafter be transmitted to the lines 42 and 43 by any of the stations.

When the device 82 times out, its now closed contact 115 feeds hot line power to energize a relay 116 to close its contacts 117 and 118 to reset the stepping relays 92 and 93 through line 89 to the reset devices 90 and 91, as well as to provide a resetting pulse to the flip flop relay 85 to reverse its contacts to the desired uniform starting position shown on the drawing, if they are not already in this position.

The now closed third contact 119 of the time delay device 82 provides hot line energization for the relay 77 to momentarily energize it and close its normally open contact 120. The contact 120 will feed a hot line pulse to the bus bar line 33 to energize the starting circuit 69 of the transporter. As soon as the delay device 82 resets itself, the relay 77 will become de-energized. Thus, in its de-energized state, the relay 77 through its contacts 78 feeds hot line power from the bus bar 33 to the release relay 79 in response to the momentary depression of the release button 72; whereas in its energized state, the relay 77 through its contact 120 supplies hot line power to the bus bar 33 to provide the starting pulse for the transporter.

Before describing the circuit components of the transporter starting circuit 69, the additional time delay devices 121 and 122 which form part of the responding circuit, will be described in relation to the safeguards provided against delayed or erroneous dialing of the calling number of a station. One side of the thermal time delay device 121 is connected to the neutral power line 35 and the other side is connected to each unused or non-active contact of the stepping relay 92, these being the contacts 2, 4, 5, 6, 8, 9 and 0 in the particular illustration shown. Conversely, the thermal time delay device 122 has one side thereof connected to the neutral power line 35 and has the other side thereof connected to each unused or non-active contact of the stepping relay 93, these being contact numbers 1, 2, 3, 4, 7, 9 and 0 in the illustration shown. Whenever the contact arm 94 of the stepping relay 92 momentarily engages one of its inactive contacts, the delay device 121 will be energized, but only momentarily and for a time which is not sufficient to cause closing of its normally open contact 123. Similarly, the momentary engagement of the contact arm 94 of stepping relay 93 with any of its unused contacts, will momentarily energize the delay device 122, but not for a sufficient time to close its normally open contact 124. It will be noted that both the contacts 123 and 124, when closed, will complete an energization circuit to the relay 116 which will cause the stepping relays 92 and 93 to be reset.

If through error, the selector dial at any station were dialed the number of the non-0existent station 28, the contact arm of the stepping relay 92 would come to rest on its contact 2 and the contact arm of the stepping relay 93 would come to rest on its contact 8. With this combination of contacts on the stepping relays 92 and 93, none of the station time delay devices 102, 104 or 106 would be energized, nor would any of the time delay devices 103, 105 or 107 be energized, nor would the time delay device 122 be energized. However, the time delay device 121 would be energized and would, after a suitable delay of 15 to 30 seconds, close its contact 123 to energize the relay 116 and reset the stepping relays 92 and 93 so that the responding circuit will be reset for the call number of a properly dialed existing station. The same sequence of events would take place if the dialed station number had, as its first digit, a number represented by an inactive or unused contact on the stepping relay 92. The same sequence of events would occur with such an unused number, even if the second digit of the station number were not dialed at all.

If the non-existent station number being dialed is a number such as the number 11 for example, then the time delay device 121 would not be energized because the contact 1 on the stepping relay 92 is not an unused or inactive contact and the device 121 is not connected to the used active contacts on the relay 92. However, the second digit of this non-existent station is represented by contact 1 on the relay 93 and, when the contact arm 94 comes to reset on this contact, it will energize the time delay device 122 to close the normally open contact 124 and energize the relay 116 to reset the stepping relays 92 and 93. This same energization of the time delay device 122 would occur whenever the contact arm 94 of the stepping relay 93 comes to rest on an inactive or unused contact for a sufficiently long time to complete the closing of the contact 124 of the device 122. Thus, the two time delay devices 121 and 122 will reset the responding circuit if either of the two digits of the call station number is represented by an unused or inactive contact on the stepping relays. Both the time delay devices 121 and 122 will be energized if the erroneous station number is a number such as 21 in which both the first and second digits are represented by inactive contacts on the stepping relays.

There is a third erroneous selector situation which may be exemplified by the non-existent station number 18. As the first digit of this station number is represented by a used or active contact on the stepping relay 92 and the second digit is represented by an active contact on the stepping relay 93, neither the time delay device 121 nor 122 would be energized by this dialing sequence. Nor would the station-identified time delay devices 102, 104 and 106 be energized by these settings of the stepping relays 92 and 93. However, the time delay device 103 is energized when the contact arm 94 of the stepping relay 92 comes to rest on the contact 1, regardless of whether the second digit of the station number is that of an existing station, such as the station 16, or a non-existent station, such as the station 18. The time delay devices 103, 105 and 107 which are connected to the active contacts of the stepping relay 92, have the longest duration of delay of any of the time delay devices utilized in the system. For example, this group of time delay devices could have a delay duration of more than 60 seconds, which would be a longer duration that that of the devices 121 and 122, which in turn would have a longer duration that the time delay device 63 in the common circuit, which in turn has a longer duration than either the device 58 in the station circuit or the time delay device 82 in the responding circuit.

When the time delay device 103 is energized for a sufficiently long period of time, its normally open contact 125 becomes closed to complete an energization circuit to the resetting relay 116 which then resets the responding circuit. Thus, whether the dialing of the selector is ineffectual because only one digit of the two digit station number has been dialed within a reasonable period of time, or because a non-existent station has been dialed, the resetting time delay devices described will be effective to reset the responding circuit and make it receptive to proper dial selection, instead of permitting it to remain in an inoperative and non-responsive status quo which could otherwise only be inconveniently remedied by locating the transporter unit and depressing its release button to reset the responding circuit.

In response to the starting pulse received by the bus bar 33 from the momentary energization of the relay 77, an energization circuit for a relay 126 is established through the normally closed contact 127 of the release button 72. The relay 126, through its now closed contact 128, establishes an energization circuit for the relay 74 and isolates this circuit from the bus bar 33 so that the bus bar need not be powered during the entire time that the relay is energized.

The now closed contact 129 of relay 74 establishes a holding circuit for the relay 74 which is independent of the de-energization of the relay 126 which results after the momentary pulse of power to the bus line 33 has been completed. This holding line includes a normally closed contact 130 of ganged limit switch 25, a normally closed contact 132 of an "emergency stop" button 131, and a normally closed contact 133 of the release button 72.

The now closed contact 134 of the relay 74 feeds hot line power to the normally closed contact 136 of a relay 135 which establishes an energization circuit for a thermal time delay device 137 which has a normally open contact 138. After the time delay device 137 times out, the contact 138 will close to energize the relay 135 and break the energization circuit to the time delay device by opening the previously closed contact 136. A now closed contact 139 of the relay 135 provides a holding circuit for the relay 135 which is established through the normally closed contact 140 of the emergency stop button 131 and through a normally closed contact 141 of the ganged limit switch 25. These limit switch contacts 130 and 141 are in series with the previously described holding circuits of the relays 74 and 135 and the switch 25 is positioned to be tripped by an energized solenoid-operated trip at any one of the station locations, such as the trip 24 previously described with reference to station 16.

A third contact 142 of the relay 135 serves to complete the circuit to the transporter drive motor 143, either directly as shown or alternatively through any suitable motor starting devices known to the art. As a consequence, the transporter unit now initiates its movement on the track 12 and will continue such movement until its limit switch 25 is engaged by the solenoid-energized trip 24 at station 16, which is the selector dial station in the example herein described. When the trip 24 opens the contacts 130 and 141, the holding circuit to the relays 74 and 135 is opened and these relays are de-energized. The motor 143 is de-energized and the transporter unit comes to a stop at the selected station.

Immediately following the engagement of the limit switch 25 by the trip 24 to de-energize the motor 143, the trip arm 18 on the transporter engages the limit switch 111 to break the holding circuit of the relay 109 and cause it to be de-energized. The momentum of the transporter, even after its motor has been de-energized, is sufficient to carry it the inch or two required for engagement with the limit switch 111.

At this point, a conventional hoist mechanism carried by the transporter unit can be activated to either load or unload the material carried by the hoist, or such other disposition may be made of the material at the station 16 as is desired. As soon as the transporter unit has fulfilled the purpose for which it was called to station 16, the operator at station 16 depresses the release button 72 to activate the responding circuit in the manner previously described and make it receptive to station selector dialing. If the operator at station 16 requires that the transporter be sent to another station, the operator at station 16 can dial the number of that other station and start the transporter on its way, after the release button has been depressed. On the other hand, if the operator at station 16 has no reason to send the transporter unit to any other station, it will simply remain at station 16 until any other station calls it. As previously described, during the time that the transporter was being programmed for station 16 and during its movement to and unloading at the station 16, the red signal lights 48 at each station were lit to make the operators at all stations aware that the transporter was not available for programming at that time. After the operator at station 16 depresses the release button, the red signal light 48 is extinguished and the green signal light 49 is lit, so that all stations become aware that the transporter unit is available for programming and use.

By reference to FIG. 1 of the drawings, it will be noted that station 16 is located on the main line of the track 12, so that the transporter unit 11 does not have to be switched over to any of the branch lines 12a or 12b in order to reach its programmed destination. If, instead of utilizing the example of station 16 as the station of destination, station 38 were the station of destination, the selection procedure and circuitry previously described would be employed in programming travel of the transporter unit to station 38.

However, inasmuch as the station 38 is located on the branch line 12a, its station circuit, through the contact 112 of the energized relay 109 for station 38, would feed power to the normally open limit switch 15 which, when closed, activates the rail switch 13 at the entrance junction of the branch line 12a and the main track 12. When the transporter unit 11 passes the limit switch 15 on the track 12, the trip 18 on the transporter unit closes the limit switch 15 an causes the track switch 13 to be activated to direct the transporter unit onto the branch line 12a.

As the transporter unit proceeds along the branch line 12a, its trip 18 engages the always energized limit switch 17 to cause the rail switch 13 to be returned to its original position. When the transporter arrives at the location of station 38, the solenoid actuated trip 24 at station 38 engages the ganged limit switch contacts 130 and 141 on the transporter to cause it to stop at the station.

Assuming that the release button on the transporter has been depressed to activate the responding circuit 30, if station 16 were to call the transporter unit, the unit would proceed counter-clockwise from station 38 on the branch track 12a to the main track 12 where it would continue in a counter-clockwise direction until it reached its destination at station 16. This is based upon the exemplary endless track arrangement shown in FIG. 1 of the drawings. Of course, if a non-endless track were used, the programming would direct the transporter unit in one direction or the other on the non-endless track depending upon the direction of the station to which the transporter unit is sent in relation to its then location.

By way of further example, in the form of arrangement shown in FIG. 1 of the drawings, if station 75 were the calling station, the contact 112 of its energized relay 109 would not only close a circuit to the limit switch 15 through line 23 but would also close a circuit to the limit switch 19 through the line 21. Therefore, wherever the transport unit was then located, after it had been guided onto the branch track 12a by closing of the limit switch 15 by engagement with the trip 18, it would then close the limit switch 19 to energize the track switch 14 which would direct the transport unit onto the branch track 12b and to the station 75 while activating the track switch return limit switch 20 during the course of its movement. Thus, in addition to utilizing the contact 112 of the station identified relay 109 to energize the solenoid-actuated trip 24, this contact is also utilized to feed power to any and all of the limit switches which energize the track switches which lie in the path of movement of the transporter unit to the selected station. Although the main track and its branches 12a and 12b could all be on the same level, it is also possible, for example, that the main track 12 be at one level and that the branch tracks 12a and 12b be at a higher or lower level so as to permit material to be moved by the transporter unit from one level to another in response to the programming of the system.

In the event there is any need or reason to stop the movement of the transporter 11 before its cycle of operation has been completed, the emergency stop button 131 can be depressed to de-energize the starting circuit 69 and make the entire system inoperative until the release button 72 on the transporter unit is again depressed.

With the illustrative arrangement herein described, a total of 100 stations could be utilized, using two digit numbers for identification of all of these stations. As previously mentioned, the addition of a station only requires that the circuit components of the new station be connected into the existing control lines which are common to all the stations. In the responding circuit, it is necessary to add a time delay device and relay identified to the new station.

In lieu of utilizing the described form of flip flop relay to direct the station selector pulses alternately to the stepping relays 92 and 93, a stepping relay could be utilized for this purpose. By replacing the flip flop relay with a stepping relay, additional responding relays, such as 92 and 93 could be employed in the system with the station selector pulses directed sequentially to these responding relays. For example, if three such responding relays were utilized, a three digit station identification system would be used and the system would have a capability of 1,000 stations.

Although the system and its circuitry have been described in relation to the operation of a material handling transporter, it will be apparent that the system circuitry could be utilized without the transporter for applications which require only selective station activation to accomplish some desired remote control function at the selected station. For example, an activated station could be used to switch certain other control or operating circuits in a pre-determined arrangement, or an activated station could control a hopper, discharge chute, door or similar dispensing or ejecting device for discharging material onto a conveyor or the like in a warehousing or processing operation or even in an automated restaurant operation. In some of such applications, the dial selector would only be provided at one central station, in other applications the dial selector might be provided at only some of the stations, but not at all of them.

It is to be understood that the forms of my invention herein shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In a material handling system having a track, a track-mounted power-driven load-carrying transporter, and a plurality of work stations located adjacent to the track, the combination of an electrical station-operating circuit for each station, a common electrical control circuit inter-connecting all stations, a dial-operated selective electrical pulsing station selector included in said station circuit and adapted to provide station identifying pulses, an electrical responding circuit connected to said common circuit and to the starting circuit of said transporter, circuit components in said responding circuit for energizing a selected station circuit in response to electrical pulse transmissions from a station selector at any station, means in said responding circuit for initiating power-driven movement of said transporter toward a selected station in response to energization of said selected station circuit, and means for opening the driving circuit to said transporter in response to arrival at said selected station of destination.

2. A combination as defined in claim 1, including a power line, a satellite power line in the common circuit connected to said power line for energizing all the station circuits, and means in the common circuit, responsive to actuation of a station selector at any one of the stations, for disconnecting said satellite line from all the station circuits and connecting said power line directly to said selecting station circuit, whereby only said actuated station selector is operative to transmit electrical pulses to said common circuit.

3. A combination as defined in claim 1, wherein said station selector transmits a single signal pulse during its actuation and separately transmits one or more intermittent station-selection pulses during such actuation, and including a single-pulse transmission line in said common circuit and connected to said responding circuit, a multi-pulse transmission line in said common circuit and connected to said responding circuit, a first stepping relay and a second stepping relay in said responding circuit, means responsive to transmission of a first signal pulse for directing pulses from said multi-pulse transmission line to said first stepping relay and responsive to a second signal pulse for directing pulses from said multi-pulse transmission line to said second stepping relay, whereby each group of selection pulses resulting from actuation of said station selector is directed to a different stepping relay to effect digital positioning thereof for electrical contact.

4. A combination as defined in claim 1, including electrically operated track switches for selectively directing transporter movement onto different sections of track, means in the station circuit for establishing an energizing circuit to controls for selected track switches, and a single control-engaging element provided on said transporter for actuating each of said energized track switch controls in response to movement of said transporter past said controls, whereby said selected track switches are energized to direct said transporter onto sections of track leading to the selected station of destination.

5. A combination as defined in claim 1, wherein said last-named means comprises a normally closed limit switch carried by said transporter in its driving circuit, and an electrically energized trip arm in the station circuit at the station of destination disposed in the path of movement of said transporter limit switch, whereby to open said driving circuit.

6. A combination as defined in claim 3, including means in said responding circuit for disconnecting itself from said pulse transmission lines in response to initiation of transporter movement, whereby said responding circuit is not receptive to pulse transmissions during transporter movement.

7. A combination as defined in claim 3, including a plurality of time delay elements in said responding circuit, each adapted to complete a resetting circuit to said stepping relays after timing out.

8. A combination as defined in claim 7, wherein said time delay elements have a progressively increasing duration of timing-out.

9. A combination as defined in claim 8, wherein the time delay elements of longer duration are operative only upon failure of operation of the time delay elements of shorter duration.

10. A combination as defined in claim 9, wherein the time delay elements of shorter duration are operative solely in response to programmed station selection pulses and the time delay elements of longer duration are operative in response to improper non-programmed station selection pulses.

11. A combination as defined in claim 10, wherein a separate time delay circuit-closing element of shorter duration is provided for selective energization of each station circuit, each of said separate time delay elements being energized solely in response to a circuit established by a predetermined combination of electrical contacts closed by the stepping relays.

* * * * *